Figure 1:
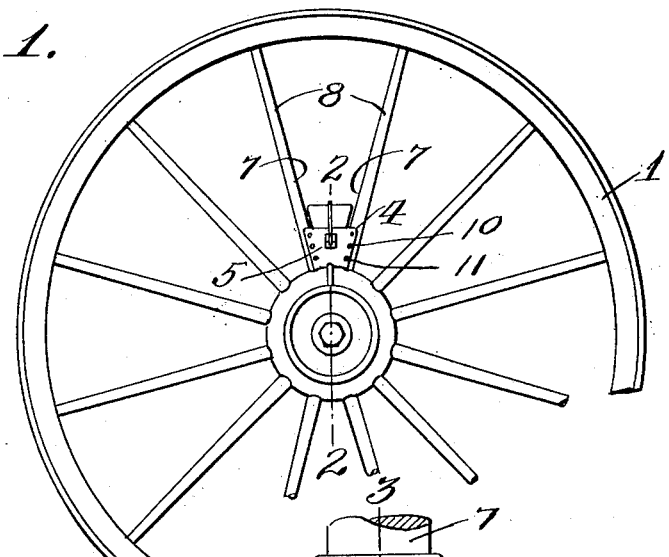

E. REGLIN.
LUBRICATOR.
APPLICATION FILED MAY 1, 1914.

1,107,226.

Patented Aug. 11, 1914.
2 SHEETS—SHEET 1.

Witnesses
Philip Terrell
Francis G. Boswell

Inventor
Edward Reglin
By D. Swift &c.,
his Attorneys

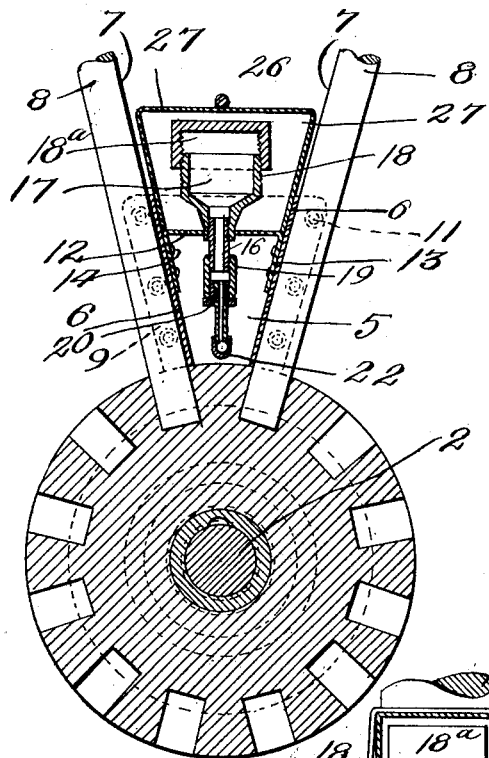
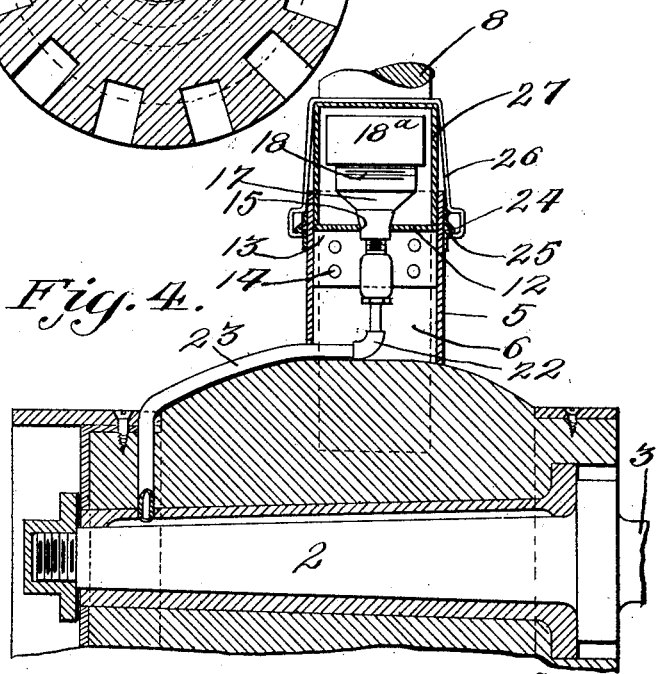

UNITED STATES PATENT OFFICE.

EDWARD REGLIN, OF COCHRANE, WISCONSIN.

LUBRICATOR.

1,107,226.  Specification of Letters Patent. Patented Aug. 11, 1914.

Application filed May 1, 1914. Serial No. 835,747.

*To all whom it may concern:*

Be it known that I, EDWARD REGLIN, a citizen of the United States, residing at Cochrane, in the county of Buffalo and State of Wisconsin, have invented a new and useful Lubricator; and I do hereby declare the following to be a full, clear, and exact description of the invention, such as will enable others skilled in the art to which it appertains to make and use the same.

This invention relates to a new and useful improved lubricator, and the object of the invention is to provide an improved box-like structure, of such a shape as to fit between and be secured to the spokes of a wheel adjacent the hub thereof, there being a lubricator cup supported in the box-like structure and having a tube or conduit terminating adjacent the spindle of the axle, adjacent the retaining nut of the wheel, or adjacent the inner end of the hub of the wheel, to convey the lubricant to the spindle.

In practical fields the details of construction may be subjected to alterations, falling within the scope of what is claimed.

The invention comprises further features and combination of parts, as hereinafter set forth, shown in the drawings and claimed.

Figure 2:
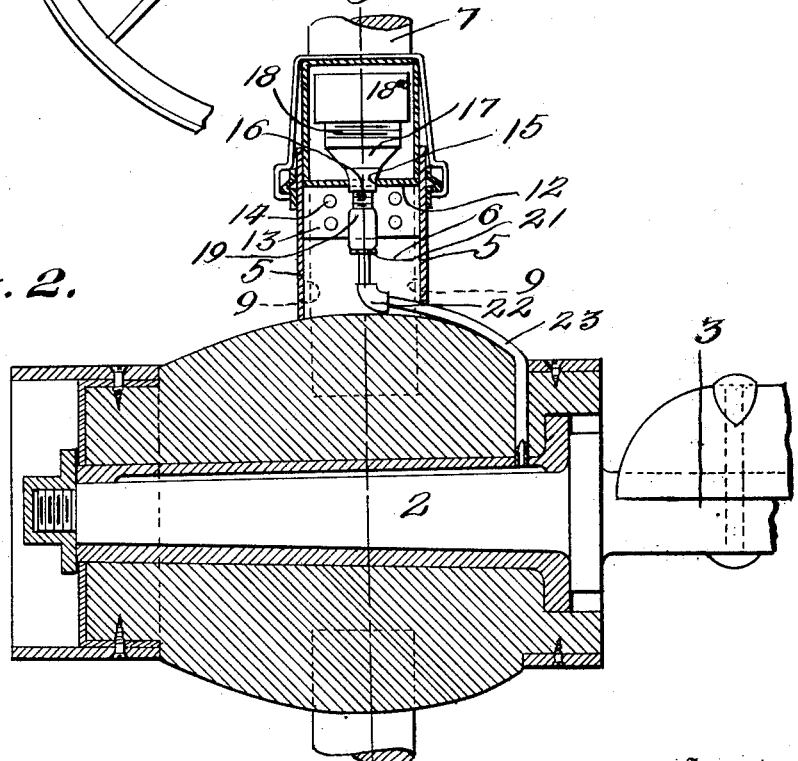

In the drawings:—Figure 1 is a view in side elevation of the vehicle wheel, illustrating the lubricator as applied thereto, the same fitting between the spokes. Fig. 2 is a sectional view. Fig. 3 is a vertical sectional view on line 3—3 of Fig. 2 at right angles thereto, showing the tube or conduit leading to the spindle of the axle adjacent the inner end of the hub. Fig. 4 is a detail view, showing the conduit or tube terminating adjacent the spindle close to the retaining nut of the wheel.

Referring more especially to the drawings, 1 designates the usual form of vehicle wheel, which is mounted upon a spindle 2 of an axle 3, only a portion of which is illustrated. A box-like structure 4 is provided comprising the vertical sides 5 and the inclined sides 6, which are disposed between and in contact with the adjacent faces 7 of two of the spokes 8 of wheel. The inclined sides 6 are provided with flanges 9, which are riveted or otherwise secured at 10 to the sides 5, thereby affording a rigid and firm structure. One of the sides 5 of the structure and the adjacent flanges 9 are secured to the two spokes, by screws or other suitable means 11, thereby holding the box-like structure in position. Arranged in the box-like structure is a transverse plate 12, the flanges 13 of which are riveted or otherwise secured at 14 to the inclined sides 6. The plate 12 has an aperture 15, in which a tube 16 is arranged. The upper end of the tube 16 terminates in a lubricant container or cup 17, to receive the lubricant. This container or cup has exterior threads 18, to which the threads on the interior of the closure or cover 18ª engage. The lower end of the tube 16 is threaded into a sleeve 19, which is in turn threaded to the connecting union 20, which is provided with a hexagon shaped flange or collar 21, whereby the union 20 may be rotated, so that the same may be threaded into the sleeve. On the lower end of the union an elbow 22 is threaded, into which a tube 23 is threaded, which terminate adjacent the spindle, either close to the retaining nut for the wheel, or in close position to the inner end of the hub of the wheel. As the spindle of the axle becomes heated, owing to the frictional contact of the bore of the wheel therewith, the lubricant, which is also in said conduit, which comprises said sleeves, tubes, union, and the elbow, becomes heated and is fed to the spindle.

The sides 5 are provided with catches 24 to be engaged by the noses 25 of the spring latches 26 of the cover or closure 27 of the box-like structure. The cover or closure 27 is of a shape to correspondingly fit within the sides of the box-like structure. The spring latches are constructed from a single length of wire, which arches over the cover or closure, and is soldered or otherwise secured to the upper face of the same.

The invention having been set forth, what is claimed as new and useful is:—

1. In combination, a box-like structure comprising vertical sides, and a pair of inclined sides fitting between and in contact with the adjacent faces of a pair of spokes of a wheel, said inclined sides having flanges secured to the vertical sides, said spokes fitting between said flanges, one of the vertical sides and its adjacent flanges being secured to said spokes, a lubricant container having a feeding tube in the box-like structure, means on the interior of the box-like structure for supporting and holding said feeding tube of said container, and a closure or cover for the box-like structure.

2. In combination, a box-like structure comprising vertical sides, and a pair of inclined sides fitting between and in contact with the adjacent faces of a pair of spokes of a wheel, a lubricant container having a feeding tube in the box-like structure, said inclined sides having flanges secured to the vertical sides, said spokes fitting between said flanges, one of the vertical sides and its adjacent flanges being secured to said spokes, a transverse plate secured on the interior of the inclined sides and provided with an aperture to receive and hold said feeding tube of said container, said vertical sides having catches, a cover or closure of a contour and shape to correspondingly fit within the box-like structure, and an arched wire secured to the cover terminating in spring latches on two of the sides of the cover to engage said catches.

3. In combination, a lubricant container having a feeding tube terminating adjacent the spindle of an axle, a box-like structure corresponding in shape to the space between two spokes of a wheel and fitting therein, and in which said lubricant feeding tube is removably supported, means for detachably securing the box-like structure to the spokes, a cover corresponding in shape to the box-like structure to telescope the upper end of the same, and latching means for the cover.

In testimony whereof I have signed my name to this specification in the presence of two subscribing witnesses.

EDWARD REGLIN.

Witnesses:
G. RICKERMAN,
C. M. RISCH.

Copies of this patent may be obtained for five cents each, by addressing the "Commissioner of Patents, Washington, D. C."